(12) United States Patent
Ting

(10) Patent No.: US 8,038,114 B2
(45) Date of Patent: Oct. 18, 2011

(54) HEAT SINK FOR NOTEBOOK COMPUTER

(76) Inventor: Shao-Chieh Ting, Banchiau (TW)

( * ) Notice: Subject to any disclaimer, the term of this patent is extended or adjusted under 35 U.S.C. 154(b) by 213 days.

(21) Appl. No.: 12/569,255

(22) Filed: Sep. 29, 2009

(65) Prior Publication Data

US 2011/0073278 A1    Mar. 31, 2011

(51) Int. Cl.
*A47B 91/00* (2006.01)
(52) U.S. Cl. .................. 248/346.01; 248/676; 248/456; 361/695
(58) Field of Classification Search ............. 248/346.01, 248/676, 456, 922; 361/679.07, 695
See application file for complete search history.

(56) References Cited

U.S. PATENT DOCUMENTS

| | | | | |
|---|---|---|---|---|
| 6,695,045 B2 * | 2/2004 | Chang | ............................ | 165/185 |
| 6,875,101 B1 * | 4/2005 | Chien | ............................ | 454/184 |
| 2003/0231466 A1 * | 12/2003 | Huang | ........................... | 361/687 |
| 2004/0027803 A1 * | 2/2004 | Tsai | ............................... | 361/695 |
| 2007/0075201 A1 * | 4/2007 | Shi et al. | .................... | 248/288.11 |
| 2008/0316692 A1 * | 12/2008 | Jacobs et al. | ................... | 361/683 |
| 2009/0001560 A1 * | 1/2009 | Stefanoski | ..................... | 257/714 |
| 2009/0090839 A1 * | 4/2009 | Lin | ................................ | 248/676 |
| 2009/0199997 A1 * | 8/2009 | Koplow | ....................... | 165/80.3 |
| 2009/0310302 A1 * | 12/2009 | Hu et al. | ........................ | 361/695 |
| 2010/0214734 A1 * | 8/2010 | Cho et al. | ................. | 361/679.46 |
| 2011/0103017 A1 * | 5/2011 | Yu et al. | ........................ | 361/697 |

* cited by examiner

*Primary Examiner* — Ramon Ramirez
(74) *Attorney, Agent, or Firm* — Muncy, Geissler, Olds & Lowe, PLLC

(57) ABSTRACT

The present invention is able to guide the wind produced by a fan interior of a heat sink when rotating to the interior of a computer, and discharge heat energy from the interior of the computer. Moreover, a user can easily adjust and fix air outlets of fan assemblies to corresponding positions beneath air inlets of a notebook computer to achieve optimum heat dissipation effectiveness. In addition, the user can adjust the screen viewing angle and height of the notebook computer, as well as make forward and rearward displacement or right and left rotation of the computer, thereby facilitating operational use by the user.

3 Claims, 5 Drawing Sheets

HEAT SINK FOR NOTEBOOK COMPUTER

BACKGROUND OF THE INVENTION (a) Field of the Invention

The present invention relates to a notebook computer heat sink, and more particularly to a heat sink able to effectively cause air flow to enter the interior of a notebook computer and discharge heat energy from the interior of the notebook computer. The heat sink is provided with fan assemblies that can be assembled at a multitude of positions; moreover, the heat sink is applicable for use with different models of notebook computers, can be adjusted to different viewing angles and heights and enables forward and rearward displacement or left and right rotation on a worktop surface.

(b) Description of the Prior Art

Heat dissipation problems have for a long time been the most troublesome problem for electric appliances, especially with the more precision electronic products. Moreover, heat dissipation problems often obstruct development of electronic products.

Development of the technological era has brought about the endeavor for high efficiency in computer operation, particularly in notebook computers. Hence, CPU (central processing unit) operating speeds have also increased along with technological development. However, because a considerably large amount of heat energy is produced when the CPU is operating, thus, the higher the CPU speed, correspondingly, the larger the heat dissipation problem is. Hence, hindrance of the heat dissipation problem is the biggest stumbling block to development of the notebook computer.

Because the notebook computer endeavors to be small in size and light to facilitate carrying by the user, however, the smaller the notebook computer is, by contrast, improvement in the heat dissipation problem of the notebook computer becomes the all-important objective.

Currently there are two methods to effect a heat sink function for notebook computers on the general market, one being the use of an upward blow type fan, the other being the use of a downward extraction type fan.

The traditional method of the upward blow type fan is to fixedly secure a heat dissipation fan to a position on a base, which thus makes it impossible to arbitrarily change position thereof. Hence, such a method is only suitable for a few computer models, and is unable to effectively direct air into the interior of the notebook computer, and thus unable to provide an effective heat sink function for notebook computers.

The heat sink method of a downward extraction type fan primarily uses rotation of a fan to draw heat energy in the interior of a notebook computer toward the direction of a heat sink, and seemingly offers an effective heat dissipation method, but in actuality does not. Because a gap exists between the notebook computer and the heat sink, thus, when the fan is rotating, the fan largely only draws the air between the notebook computer and the heat sink, and is unable to completely extract hot air from the interior of the notebook computer. Accordingly, such a method is basically unable to achieve the effectiveness to realize comprehensive heat dissipation for the notebook computer.

Hence, in order to resolve the aforementioned problems between the heat sink and notebook computer, the inventor of the present invention has invented a notebook computer heat sink which primarily superposes, as far as possible, air inlets of a notebook computer with air outlets of a heat sink through a combination configuration of fan assemblies and a perforated plate. Accordingly, the air within the notebook computer can be effectively extracted when a fan in the interior of the heat sink is rotating, thereby improving heat dissipation efficiency.

In addition, the present invention enables freely adjusting the screen viewing angle and height of the notebook computer, thereby improving comfortability for the user.

Furthermore, the bottom surface of the base of notebook computer heat sinks on the current market are mostly fitted with a plurality of rubber pads, and although they enable ensuring that the base does not move during use of the computer, however, such means also greatly increases operating inconvenience for the user. When wanting to displace the position of the computer, the user must lift and move the computer together with the heat sink, which is time-consuming and wastes effort.

Accordingly, the notebook computer heat sink of the present invention uses disposition of rollers and a displacement control assembly to facilitate operational use by the user.

SUMMARY OF THE INVENTION

The primarily objective of the present invention is to provide a heat sink having better heat dissipation efficiency, which is able to maintain a superposed configuration, as far as possible, between an air inlet of a notebook computer and an air outlet of a heat sink, and thereby enable airflow to effectively enter the interior of the notebook computer when a fan in the interior of the heat sink is rotating. The heat sink primarily comprising a perforated plate, a base, a displacement control assembly, a plurality of rollers, a plurality of fan assemblies, a supporting frame, a plurality of rubber studs, a plurality of antislip stop posts, a plurality of wire fasteners, and a plurality of pads.

Another objective of the present invention lies in enabling the user to allocate the positions of the fan assemblies of the heat sink according to different models of notebook computers through a combined configuration of the fan assemblies and the perforated plate, so as to superpose, as far as possible, air inlets of a notebook computer with the air outlets of the heat sink. Accordingly, air can be effectively drawn into the interior of the notebook computer when the fan in the interior of the heat sink is rotating, thereby improving heat dissipation effectiveness.

Yet another objective of the present invention lies in the heat sink being fitted with the supporting frame to enable adjusting the perforated plate to a plurality of angles, and thus increase comfortability of use for the user.

Another objective of the present invention lies in the heat sink being fitted with the plurality of rollers and the displacement control assembly, whereby pressing down on the displacement control assembly enables forward and rearward displacement or right and left rotation of the heat sink, thus facilitating operation by the user.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 1:
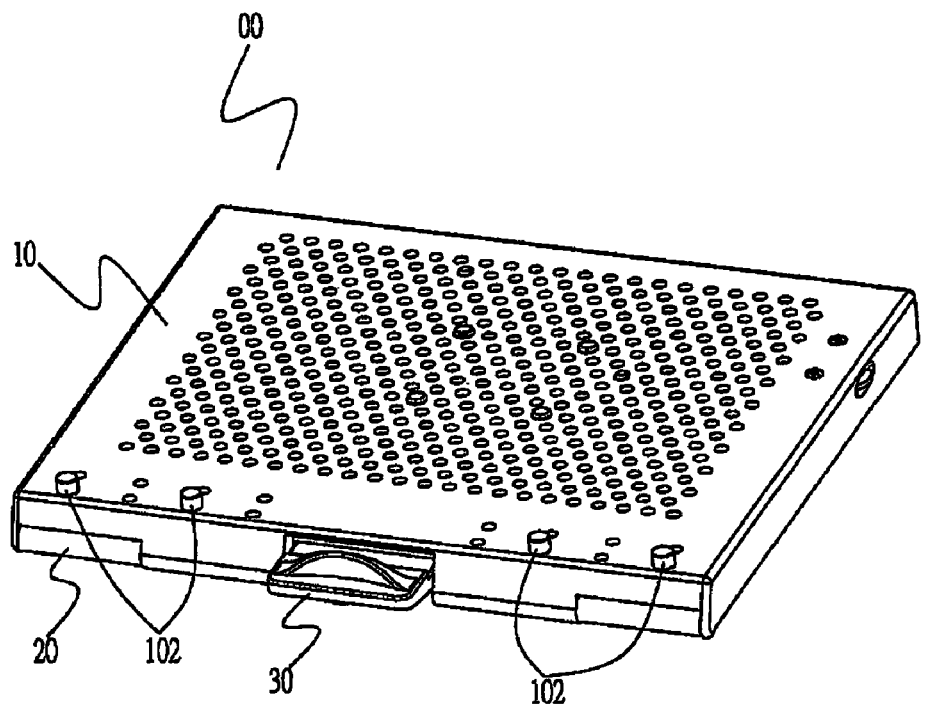
FIG. 1 is an elevational schematic view of a heat sink of the present invention.
Figure 2:
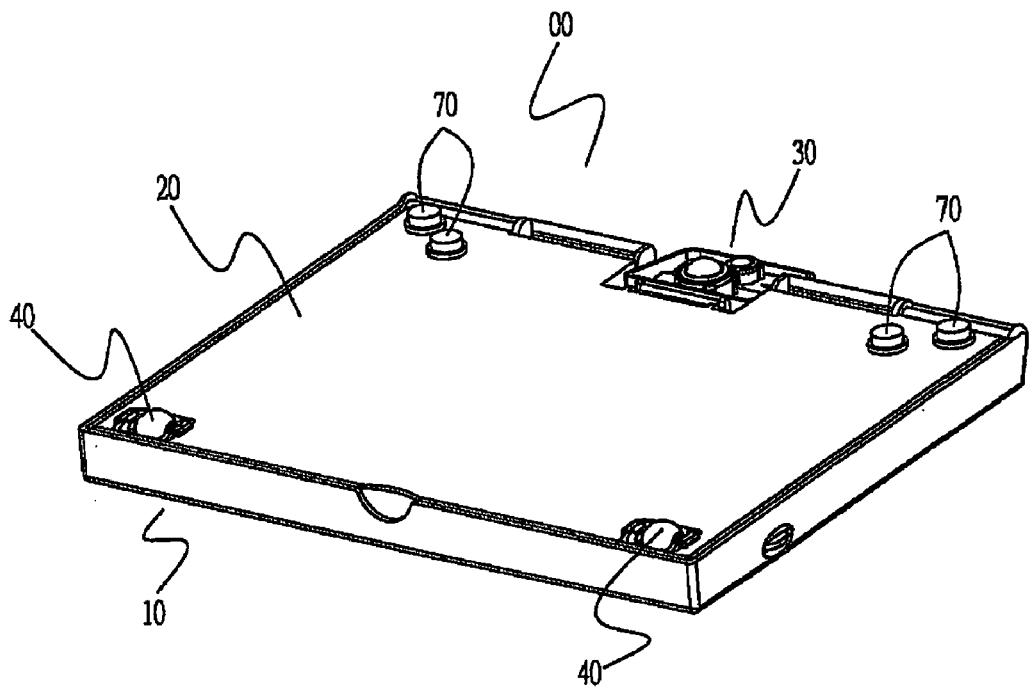
FIG. 2 is an elevational schematic view of the bottom surface of the heat sink of the present invention.
Figure 3:
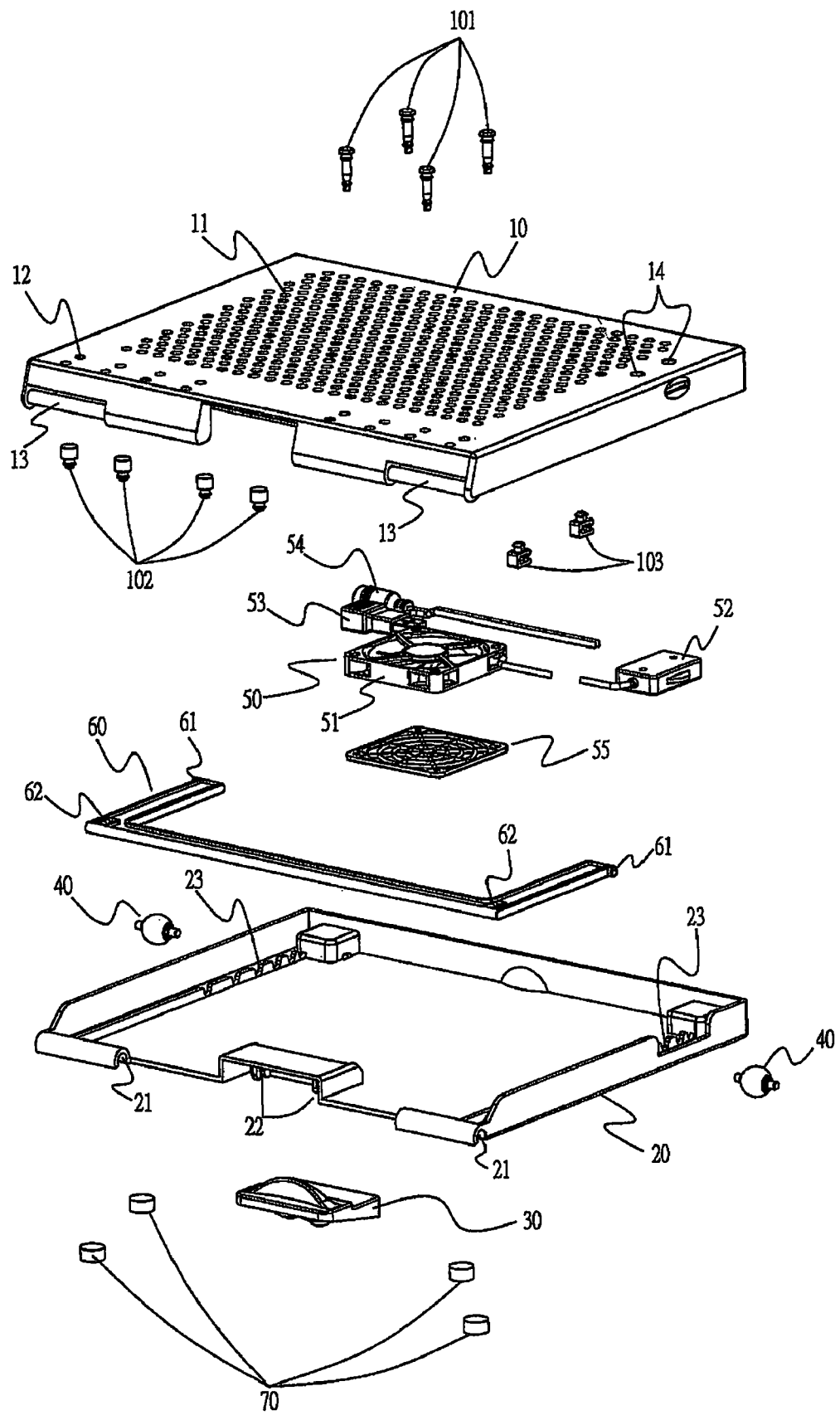
FIG. 3 is an exploded elevational schematic view of the heat sink of the present invention.
Figure 5:
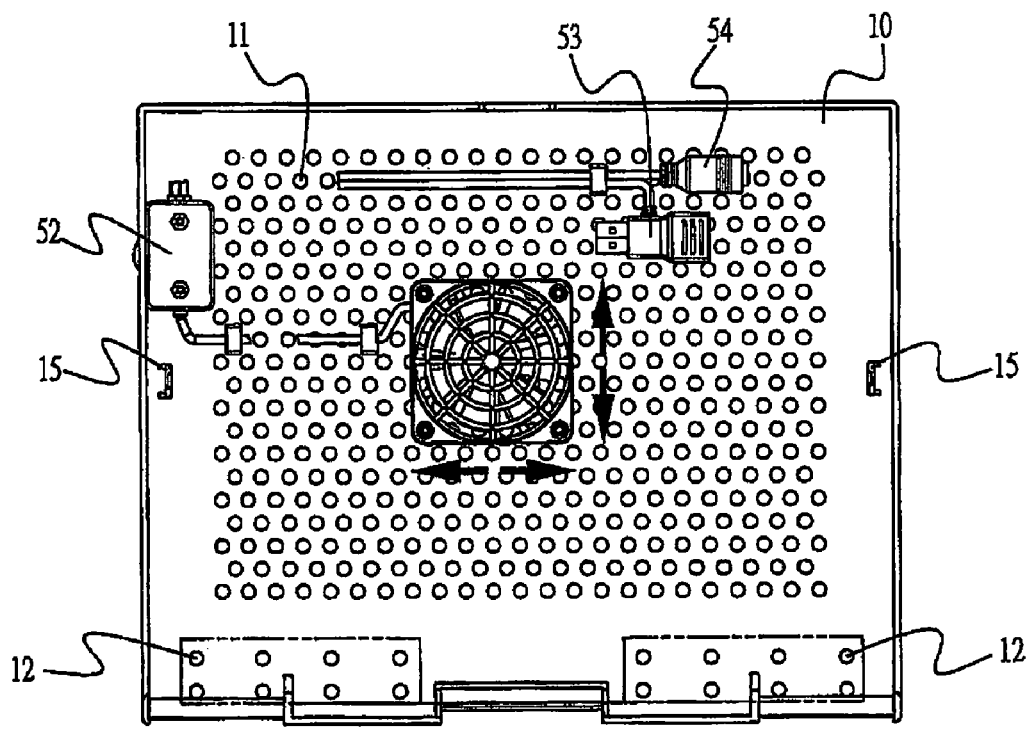
FIG. 5 is a disposition schematic view of a fan assembly of the heat sink of the present invention.
Figure 6A:
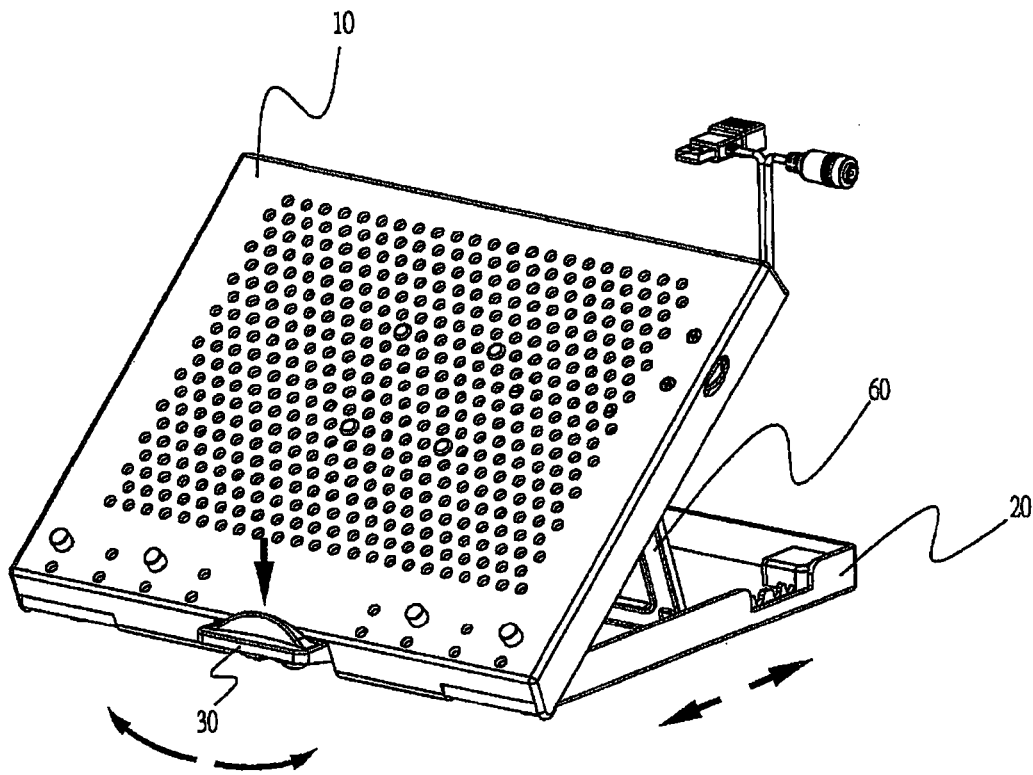
FIGS. 6A, 6B are elevational schematic views depicting tilt angles of a perforated plate of the heat sink according to the present invention.
Figure 6B:
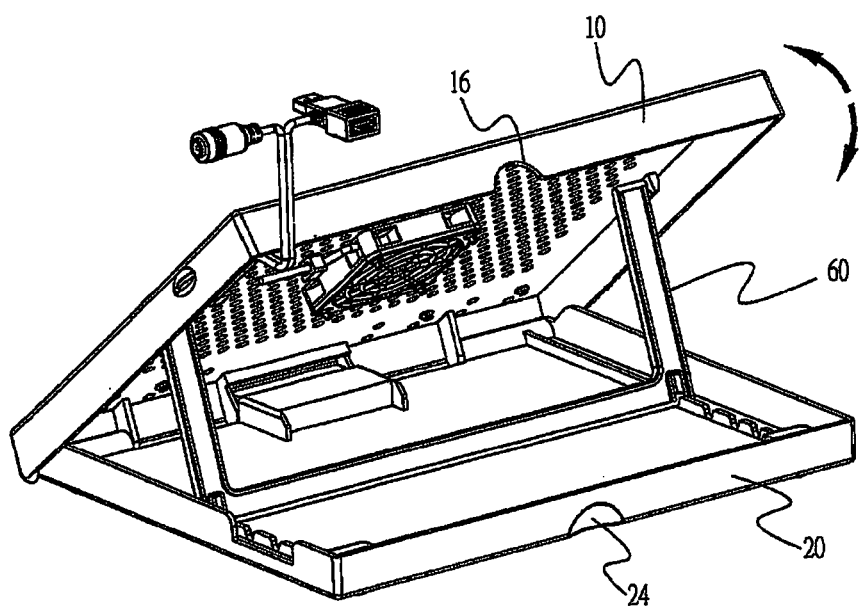

Referring first to FIG. 1, FIG. 2 and FIG. 3, which disclose elevational schematic views and an exploded schematic view of a heat sink of the present invention, and it can be seen from the drawings that a heat sink 00 of the present invention comprises a perforated plate 10, a base 20, a displacement control assembly 30, a plurality of rollers 40, a plurality of fan assemblies 50, a supporting frame 60, a plurality of rubber studs 101, a plurality of antislip stop posts 102, a plurality of wire fasteners 103 and a plurality of pads 70. Wherein:

Referring together to FIG. 5 and FIG. 6B, the perforated plate 10 is used to enable a notebook computer to be superposed thereon. The perforated plate 10 is provided with a plurality of holes 11, and a plurality of antislip stop post locating holes 12. Moreover, the perforated plate 10 is further provided with a pivot 13 at each of two sides thereof, two air speed regulator fixing holes 14, two supporting structures 15 for the supporting frame 60 are located on two internal sides of the perforated plate 10, and a rear portion is provided with a clasp hole 16.

The base 20 is located below the perforated plate 10, and two sides of the base 20 are provided with shaft holes 21, which enable the pivots 13 disposed on the perforated plate 10 to be nested therein, thereby enabling the perforated plate 10 to rotate to different angles. The bottom portion of the base 20 is provided with displacement control assembly fixing holes 22, and the front is provided with a plurality of tilt angle holddown grooves 23 and a finger position 24.

Figure 4:
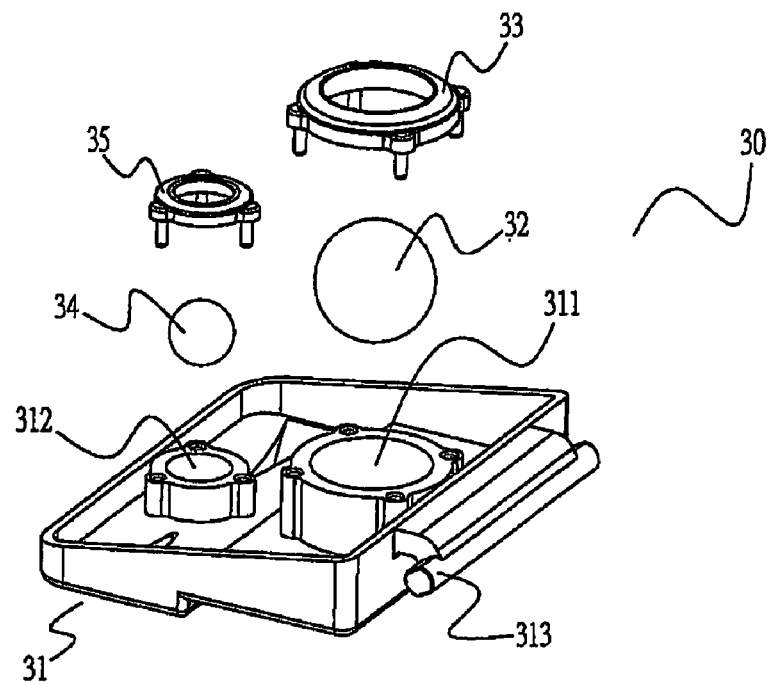
FIG. 4 is an exploded elevational schematic view of a displacement control assembly of the heat sink of the present invention.

Referring together with FIG. 4, which shows the displacement control assembly 30 comprising a hand lever 31, a large ball bearing 32, a large ball bearing cover 33, a small ball bearing 34 and a small ball bearing cover 35, wherein the hand lever 31 is provided with a large ball bearing holddown groove 311, a small ball bearing holddown groove 312 and a rotating shaft 313.

The DC (direct current) fan assemblies 50 comprise a plurality of DC fans 51, an air speed regulator 52, a USB (universal serial bus) male and female plug 53, an earphone jack 54 and a plurality of DC fan net covers 55.

A fixed rotating shaft 61 and a relief groove 62 are located at two ends of the supporting frame 60.

The rollers 40 and the pads 70 are located on the bottom portion of the base 20.

Referring together with FIG. 5, which shows a disposition schematic view of the fan assembly 50 on the perforated plate 10 according to the present invention, and it can be seen from the drawing that adaptability of the present invention enables the fan assembly 50 to be disposed at a multitude of fan heat dissipating positions.

Referring to FIG. 6A, which shows an elevational schematic view of the perforated plate 10 rotated through an angle, and pressing down on the displacement control assembly 30 enables forward and rearward displacement or right and left rotation of the heat sink 00 on a worktop surface.

Figure 7:
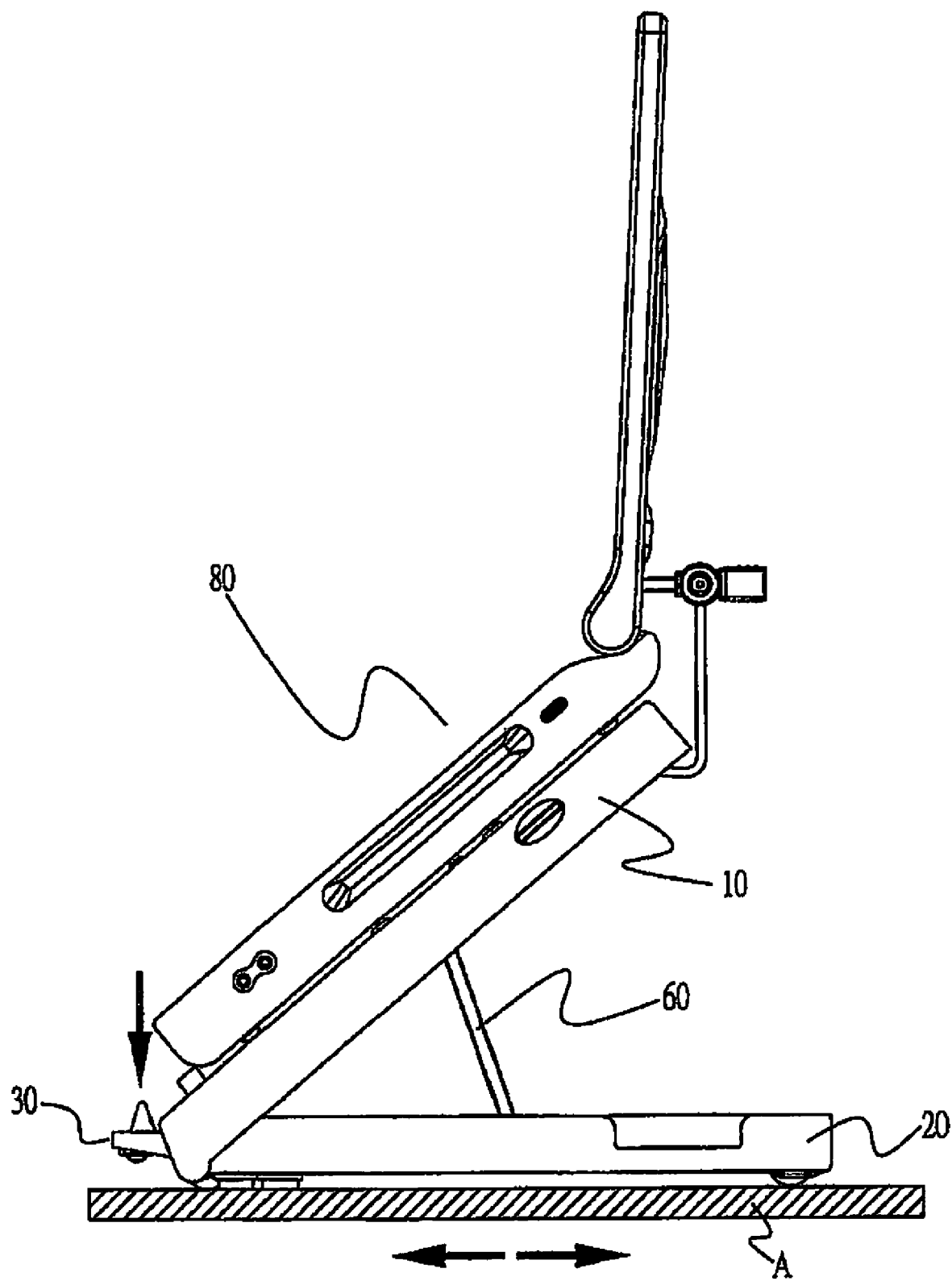
FIG. 7 is a side schematic view of a notebook computer superposed on the heat sink of present invention.

Referring to FIG. 7, which shows a side schematic view of a notebook computer 80 superposed on the perforated plate 10, and as depicted in the drawing, pressing down on the displacement control assembly 30 and displacing the heat sink 00 in frontward or rearward directions enables achieving the effectiveness to displace the notebook computer 80 together with the heat sink 00 forward or rearward on a worktop surface A. Hence, enabling the notebook computer 80 to be freely displaced frontward and rearward improves convenience of use of the notebook computer 80 in practice.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A heat sink for notebook computer, comprising:
   a perforated plate, the perforated plate is used to enable superposing a notebook computer thereon, a plurality of holes are defined in the perforated plate;
   a base;
   a displacement control assembly, a plurality of rollers, a plurality of DC (direct current) fan assemblies, a supporting frame, a plurality of antislip stop posts, a plurality of pads, a plurality of rubber studs, and a plurality of wire fasteners.

2. The heat sink for notebook computer according to claim 1, wherein the fan assemblies are fixed to the perforated plate using the rubber studs, thereby enabling the user to more easily adjust positions of the fan assemblies.

3. The heat sink for notebook computer according to claim 1, wherein the rollers and the displacement control assembly enable moving the heat sink on a worktop surface to allow forward and rearward displacement or right and left rotation thereon.

* * * * *